Patented Dec. 25, 1951

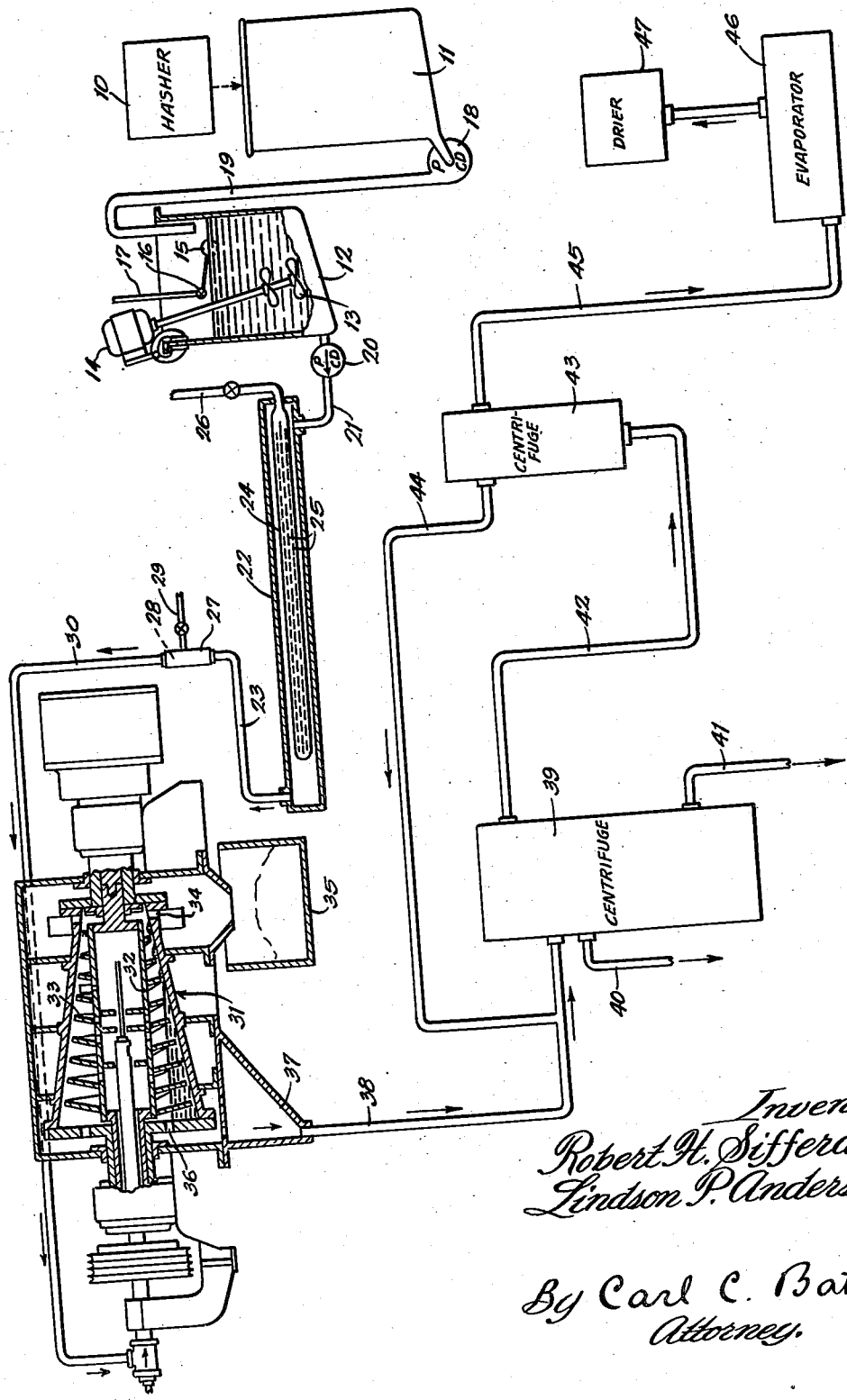

2,580,049

UNITED STATES PATENT OFFICE 2,580,049

PREPARATION OF GELATIN

Robert H. Sifferd, Clarendon Hills, and Lindson P. Anderson, Chicago, Ill., assignors to Armour and Company, Chicago, Ill., a corporation of Illinois Application September 18, 1947, Serial No. 774,797

4 Claims. (Cl. 260—118)

This invention relates to the preparation of gelatin. It is particularly useful in the recovery of gelatin from collagen-bearing materials.

An object of the invention is to provide a process in which gelatin may be recovered in high yield and in a brief period from collagen-bearing materials, including fat-bearing materials. Yet another object is to provide a simple and effective process in which gelatin is recovered in the hydrolysis of collagen and without the use of acid or alkali. Yet another object is to provide a method and means for the preparation of gelatin through the treatment of collagen-bearing materials and in a continuous process to produce edible gelatin. Yet another object is to provide a process for the treatment of collagen and fat-bearing material whereby gelatin is produced and fat is recovered as a by-product. Other specific objects and advantages will appear as the specification proceeds.

The process herein may be effectively carried on in apparatus of the character illustrated diagrammatically and partly in section by the accompanying drawing.

The process of this application may be carried on in different forms of apparatus. In one phase of the invention, collagen-bearing material is comminuted in a hasher 10 or by hand, and the comminuted material is introduced into the feed tank 11. From the feed tank, the material is passed to a mixing tank 12 equipped with a mixer 13 driven by a motor 14. A float 15 controls a valve 16 in the water line 17 so as to introduce water to maintain the level, as indicated in the drawing. A proportioning pump 18 delivers material from the tank 11 through pipe 19 to the mixing tank 12. A similar proportioning pump 20 forces material from the mixing tank 12 through pipe 21 into a tubular heater 22. The pumps 18 and 20 are so co-ordinated as to introduce a predetermined amount of water into the tank 12. By operating pump 20 so that it withdraws more material from the tank 12 than is introduced into it by the pump 18, there will be automatically introduced into tank 12 a predetermined amount of water.

The amount of water to be introduced into the material undergoing treatment will vary according to the type of material. If hashed skin or hide trimmings, tendons, guts, etc., are introduced, sufficient water must be added to carry the material in suspension and permit it to flow through the pipes. On the other hand, if fat-bearing material, such as pork fat, is introduced, the water of the tissues may be sufficient in itself so that no water or very little water need be introduced.

The heater 22 comprises a closed cylinder to one end of which the inlet 21 is connected. To the opposite end is connected an outlet pipe 23. Extending centrally through the heater tube 22 is a steam pipe 24 closed at its inner end and provided with spaced perforations 25 through which the steam is introduced in the form of jets into the chamber. As the material passes lengthwise of the tubular casing 22 and crosswise of the jets 25, there is a mechanical action which serves to mix and agitate the material and to bring about a quick transfer of heat. At the same time, the steam forms a sheath about the tube 24 and prevents the collagen from coagulating thereon. At the same time, the condensation of the steam produces a water mass that aids in the washing of the material and in the agitation thereof.

Various temperatures are required in the treating of different materials. We introduce through valve-controlled pipe 26 sufficient steam to raise the temperature of the collagen to a hydrolyzing temperature for the production of gelatin while keeping the temperature below that at which the collagen will be hydrolyzed beyond the gelatin stage. In the treatment of collagen-bearing pork fat, we prefer to keep the temperatures between 212° and 300° F., and for the higher temperatures a pressure must be maintained within the heater tube.

The desired pressure may be maintained by any suitable means. In the illustration given, 27 indicates a specific form of valve employing a flexible tube 28 within a chamber and controlled by pressure fluid passing through a valve-controlled line 29. It will be understood, however, that any suitable type of valve may be employed.

The material passes through valve 27 and thence through pipe 30 to the entrance of the centrifugal machine 31. Since the centrifuge 31 is of well-known construction, a detailed description is believed unnecessary. In the operation of the centrifuge, a central member 32 is rotated and causes the fins 33 to work the solid material upwardly toward a solids outlet opening 34. The solids drop into a container 35. The liquids in the centrifuge are discharged through the overflow opening 36 and downwardly through a discharge port 37 into pipe 38.

The solids discharged into the receiving tank 35 may be sent to the drier for recovery as tankage. However, such solids contain collagen and it is preferred that they be reground, suspended in water, and rerun through the heater for a further recovery of gelatin.

The liquid from the centrifuge 31 passes downwardly through pipe 38 to a second centrifuge 39. The centrifuge 39 is illustrated diagrammatically and represents a well-known type of centrifuge which divides the stream of liquid into three parts. Through pipe 40, the centrifuge discharges the major portion of the oil or melted fat. Through pipe 41, the centrifuge discharges fine solids. Through pipe 42, the centrifuge discharges the water phase of the material containing a trace of oil. Pipe 42 discharges the water and oil into a third centrifuge 43, which divides the stream into two streams. One stream contains a trace of oil and is discharged through pipe 44 so that it may be returned to the pipe 38 leading into the centrifuge 39. The remaining stream of water is discharged through pipe 45 and is passed to an evaporator 46 for the recovery of the gelatin. The gelatin may be passed then from the evaporator to a drier 47 to produce the final desired product. The gelatin recovered is edible gelatin and of high quality. While the gelatin is illustrated as being recovered through the evaporation of the water, it will be understood that any other suitable means for the recovery of gelatin may be employed.

It will be understood that in the foregoing operation, no acid or alkali is employed. Further, the flash heating method or step is effective as a control against the over-hydrolyzing of the collagen. We have found that by subjecting the collagen-bearing material to an exceedingly brief heating step in the presence of steam by which the mass is agitated, that the mass of the collagen is hydrolyzed only to the gelatin stage, and this is accomplished without scorching or damaging the protein in the material. As a by-product, any fat present is recovered from the second centrifuge 39 as a finished fat through the pipe 40. We have obtained good results where the flash heating period is for less than a second, but we prefer to carry on the flash heating during the interval of from about one to eight seconds. It will be understood that for some operations that a longer interval of time, up to about one minute, should be employed.

The process is continuous. It enables the operation to be carried on in small and compact apparatus. The only pressure vessel is that of the small heater tube 22. By reason of the extremely brief period of heating, a large quantity of material is successfully heated in the tube 22 in spite of its small size.

Why the flash heating by steam of collagen-bearing material is so effective in the production of gelatin and without the aid of acid or alkali, we are unable to state. The brief interval of the heating in conjunction with the turbulence produced by the injection of steam and the effect of the added water through the condensation of steam, brings about a uniform heating of the material throughout so that hydrolyzing of the collagen to the gelatin stage and not beyond the gelatin stage occurs. At the same time, the fat within the material is rendered, and such fat together with the solids and the gelatin are readily recovered in the subsequent stages as described.

Following are specific examples of operation in accordance with our process:

*Example 1*

12,000 pounds of pork skins from which the fat has been removed, are reduced by grinding to a particle size of one-eighth inch. This hashed material is pre-mixed with water and the resulting slurry delivered at a constant rate (about 200 pounds per minute) to a steam flash cooker. The cooker is operated at 212° F. and at atmospheric pressure to hydrolize the collagen. The hydrolyzed mass is delivered continuously to a centrifuge of the continuous discharging self-cleaning centrifugal classifier type. This operation accomplishes separation into two phases, (1) a water-oil emulsion, and (2) insoluble particles. The insoluble particles of protein may be used for tankage. The water-oil emulsion is delivered continuously to a second centrifuge of the continuous discharging self-cleaning centrifugal operator type, which is a self-cleaning machine. This operation accomplishes a three-way separation, yielding the following fractions: (1) clean dry oil, (2) gelatin water containing oil, and (3) fine meat particles suspended in water. The clean dry oil fraction is sent to the usual finishing operation for lard production; the gelatin water containing some oil is delivered to a third centrifuge of the continuous discharging self-cleaning centrifugal operator type; and the fine meat particles suspended in water is recycled along with further quantities of hashed skins. The water-containing oil is separated in the third centrifuge into (1) clean gelatin water for production of edible gelatin, and (2) oil containing a small amount of gelatin water which is returned to the second centrifuge for reseparation.

*Example 2*

The procedure of Example 1 is repeated using pork intestines of pork skins. Although intestines are considered inferior to pork skins for the production of gelatin, the gelatin produced by our process from intestines is substantially the same high quality as gelatin produced from pork skins.

The procedure of Example 1 may be used in connection with pork skin trimmings, tendons, or mixtures of intestines, skin trimmings and tendons, and the same good results obtained.

*Example 3*

The same general procedure as set forth in Example 1 is followed using 12,000 pounds of pork skins, but using a temperature of 320° F. and 75 pounds pressure in the cooking operation. Substantially the same good results are obtained as outlined in Example 1.

The same procedure may be practiced as above using 320° F. and 75 pounds pressure in the cooking operation, but using intestines or tendons instead of pork skins. Good results are also obtained in these modifications.

While in the foregoing specifications, we have set forth certain steps of the process in detail and have described the apparatus in detail, all for the purpose of showing one embodiment of the invention, it will be understood that such details may be varied widely by those skilled in the art without departing from the spirit of our invention.

We claim:

1. In a process for recovering edible gelatin from collagen bearing material, the steps of comminuting the material, flash heating said material while passing the material in the form of an aqueous slurry continuously through an elongated restricted zone and while maintaining said material in turbulent agitation by means of a plurality of steam jets within said restricted zone, whereby said material is uniformly heated and the collagen in said collagen bearing material is hydrolyzed to gelatin without any substantial portion of the collagen being hydrolyzed beyond the gelatin stage, continuously separating the resulting material into substantially solid and liquid fractions, and separating the gelatin from the liquid fraction.

2. The process of claim 1 in which the flash heating is for a period of less than one minute.

3. The process of claim 1 in which the flash heating is for a period of from one to eight seconds.

4. In a process for recovering edible gelatin from collagen bearing material, the steps of comminuting the material, flash heating said material at a temperature of about 212° to 320° F. under pressure while passing the material in the form of an aqueous slurry continuously through an elongated zone of restricted cross-section and while maintaining said material in turbulent agitation by means of a plurality of steam jets within said restricted zone, whereby said material is uniformly heated and the collagen in said collagen bearing material is hydrolyzed to gelatin without any substantial portion of the collagen being hydrolyzed beyond the gelatin stage, reducing said pressure to about atmospheric, continuously separating the resulting material into substantially solid and liquid fractions, and separating the gelatin from the liquid fraction.

ROBERT H. SIFFERD.
LINDSON P. ANDERSON.

REFERENCES CITED

The following references are of record in the file of this patent:

UNITED STATES PATENTS

| Number | Name | Date |
| --- | --- | --- |
| 130,230 | McDougall et al. | Aug. 6, 1872 |
| 728,205 | Cormack | May 19, 1903 |
| 2,397,973 | Mueller | Apr. 9, 1946 |